United States Patent [19]

Okada

[11] Patent Number: 5,111,518
[45] Date of Patent: May 5, 1992

[54] OPTICAL INTEGRATED CIRCUIT

[75] Inventor: Kenichi Okada, Tokyo, Japan

[73] Assignee: Japan Aviation Electronics Industry, Ltd., Tokyo, Japan

[21] Appl. No.: 686,597

[22] Filed: Apr. 17, 1991

[30] Foreign Application Priority Data

Apr. 20, 1990 [JP] Japan .................................. 1-14606

[51] Int. Cl.⁵ ............................ G02B 6/00; G02B 6/36
[52] U.S. Cl. .................................................... 385/14
[58] Field of Search .......................... 350/96.10–96.14

[56] References Cited

U.S. PATENT DOCUMENTS

| | | | |
|---|---|---|---|
| 4,265,541 | 5/1981 | Leclerc et al. | 350/96.14 |
| 4,468,085 | 8/1984 | Papuchon et al. | 350/96.14 |
| 4,645,345 | 2/1987 | Domann | 350/96.14 X |
| 4,938,594 | 7/1990 | Pavlath | 350/96.14 X |

Primary Examiner—Akm E. Ullah
Attorney, Agent, or Firm—Pollock, Vande Sande & Priddy

[57] ABSTRACT

First and second optical waveguides are provided which extend at one end to one side of an electro-optic plate and are interconnected at the other ends, and the connection point is connected to one end of a third optical waveguide. Light from the third optical waveguide is branched to the first and second optical waveguides, whereas light beams from the first and second optical waveguides are supplied together to the third optical waveguide. The angle of the first optical waveguide to the above-mentioned one side of the electro-optic plate is deviated from 90°. The end face of the first optical waveguide at that side forms a reflecting surface and is connected to one end of a fourth optical waveguide. The other end of the fourth optical waveguide extends to another side of the electro-optic plate. By forming end faces of the second and fourth optical waveguides at different sides of the electro-optic plate, optical active elements can be fixed directly to such end faces, even if the electro-optic plate is small.

7 Claims, 5 Drawing Sheets

FIG. 1 PRIOR ART
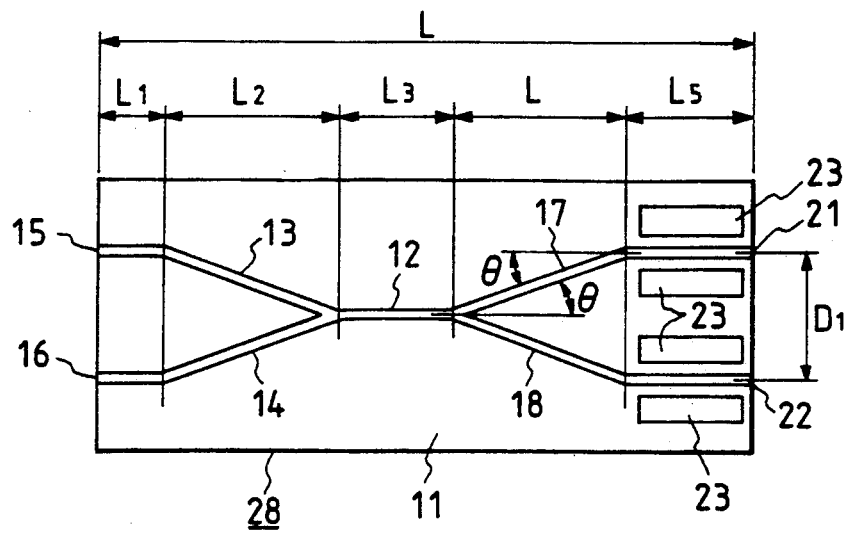
FIG. 2A PRIOR ART
FIG. 2B PRIOR ART
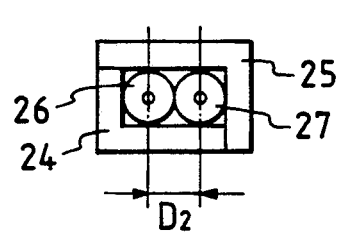

1

OPTICAL INTEGRATED CIRCUIT

BACKGROUND OF THE INVENTION

The present invention relates to an optical integrated circuit which has branched optical waveguides, and more particularly to an optical integrated circuit which permits direct mounting thereon of a photodetector, a light emitting element, or similar optical active elements and can be miniaturized.

FIG. 1 shows a conventional optical integrated circuit, indicated generally by 28. On an electro-optic plate 11 as of lithium niobate ($LiNbO_3$) there is formed an optical waveguide 12, which has one end branched into optical waveguides 13 and 14 extending to optical waveguide terminals 15 and 16 at one side of the electro-optic plate 11 and has its other end branched into optical waveguides 17 and 18 extending to optical waveguide terminals 21 and 22 at the opposite side of the electro-optic plate 11. Electrodes 23 are formed on both sides of the parallel-extending portions of the optical waveguides 17 and 18 near the terminals 21 and 22 to provide an optical phase modulating function.

For input and output of light with respect to such an optical integrated circuit, it is a common practice in the prior art to employ a method in which an optical fiber has one end face fixedly bonded to each optical waveguide terminal, or a method in which optical fibers of the same number as that of the optical waveguide terminals at one side of the electro-optic plate 11 are fixed to an optical fiber holder which is connected to the optical integrated circuit.

FIGS. 2A and 2B are a front view and a plan view of an optical fiber holder for holding two optical fibers. The optical fiber holder is composed of two holder halves 24 and 25, which are assembled together to fixedly hold two optical fibers 26 and 27 at one end disposed in parallel as shown and their end faces are ground or polished. The core spacing $D_2$ of the optical fibers 26 and 27 is equal to the outer diameter of each optical fiber. Since the outer diameter of the optical fiber is 125 $\mu$m, for example, in the case of a single mode optical fiber commercially available in Japan, the spacing $D_2$ is 125 $\mu$m, for instance. Accordingly, the distance $D_1$ (FIG. 1) between optical waveguide terminals at one side of the optical integrated circuit 28 is also designed to be 125 $\mu$m.

The angle of bend $\theta$ at which the optical waveguide is branched is several degrees or less in many cases. Now, consider that the angle of bend $\theta$ of the branched optical waveguide 17 to the optical waveguide 12 is, for example, 1° in FIG. 1. In order that the spacing $D_1$ may be 125 $\mu$m, the lengths $L_2$ of those portions of the branched optical waveguides 17 and 18 which are inclined to the optical waveguide 12 are about 3.6 mm. In the case where the length $L_3$ of the optical waveguide 12 is 7 mm, the length $L_5$ of each of the parallel portions of the optical waveguides 17 and 18 where the optical phase modulating function is provided is 12 mm and the length $L_1$ of each of the parallel portions of the optical waveguides 13 and 14 is 3 mm, the entire length L of the optical integrated circuit is 29.2 mm.

The optical integrated circuit shown in FIG. 1 is used in a fiber optic gyro, for instance. FIGS. 3 and 4 show an example of the fiber optic gyro, in which a bobbin 32 with an optical fiber coil 33 wound thereon is mounted on a chassis 31 covered with a cover 29, a light source module 34 and a photodetector module 35 are disposed inside the bobbin 32, a base plate 36 is disposed on an upper plate 32A of the bobbin 32 and the optical integrated circuit 28 is mounted on the base plate 36 through a mounting plate 37.

Optical fiber holders 39 and 41, each holding two optical fibers, are fixedly bonded to the two optical waveguide terminals at the opposite sides of the optical integrated circuit 28. The one optical fiber 42 held by the holder 39 is connected by fusion to an optical fiber 43 extending from the light source module 34, whereas the other optical fiber 44 is connected by fusion to an optical fiber 45 extending from the photodetector module 35. Optical fibers 46 and 47 held by the holder 41 are each connected by fusion to one end of the optical fiber coil 33. Conventionally, the optical integrated circuit and other modules are thus connected using optical fibers.

In the optical integrated circuit 28 depicted in FIG. 1, since the distance $D_1$ between two optical waveguide terminals is only 125 $\mu$m or so, a photodetector and a light emitting element, or an optical fiber holder and a photodetector or light emitting element, each having a 1 mm or more chip size, cannot be mounted side by side on the optical integrated circuit 28. To mount the photodetector and the light emitting element side by side on the optical integrated circuit, it is necessary to increase the distance $D_1$ between the optical waveguide terminals, and this calls for an increase in the length $L_2$ of each of the inclined portions of the branched optical waveguides 13 and 14, inevitably making the optical integrated circuit bulky.

SUMMARY OF THE INVENTION

It is therefore an object of the present invention to provide a miniature optical integrated circuit in which optical waveguide terminals are sufficiently spaced apart to permit direct mounting thereon of a photodetector and a light emitting element.

According to the present invention, in the optical integrated circuit wherein first and second optical waveguides formed on an electro-optic plate each extend at one end to one side of the electro-optic plate, the other ends of the first and second optical waveguides are connected to each other and the connection point is connected to a third optical waveguide so that light beams from the first and second optical waveguides are supplied together to the third optical waveguide and light from the latter is branched to the former, one end of the first optical waveguide meets the corresponding side of the electro-optic plate at an angle which deviates from 90°, the end face of the first optical waveguide forms a reflecting surface and a fourth optical waveguide is provided by which light reflected by the reflecting surface is guided to another side of the electro-optic plate.

With such a structure as mentioned above, even if the branched optical waveguides are formed short, that is, even if the optical integrated circuit is formed small, the optical waveguide terminals are sufficiently spaced apart so that active elements such as a photodetector and a light emitting element can be mounted directly on the optical integrated circuit.

BRIEF DESCRIPTION OF THE DRAWINGS

FIG. 1 is a plan view showing a conventional optical integrated circuit;

FIG. 2A is a front view of an optical fiber holder;

FIG. 2B is a top plan view of the optical fiber holder;

DESCRIPTION OF THE PREFERRED EMBODIMENTS

Figure 5:
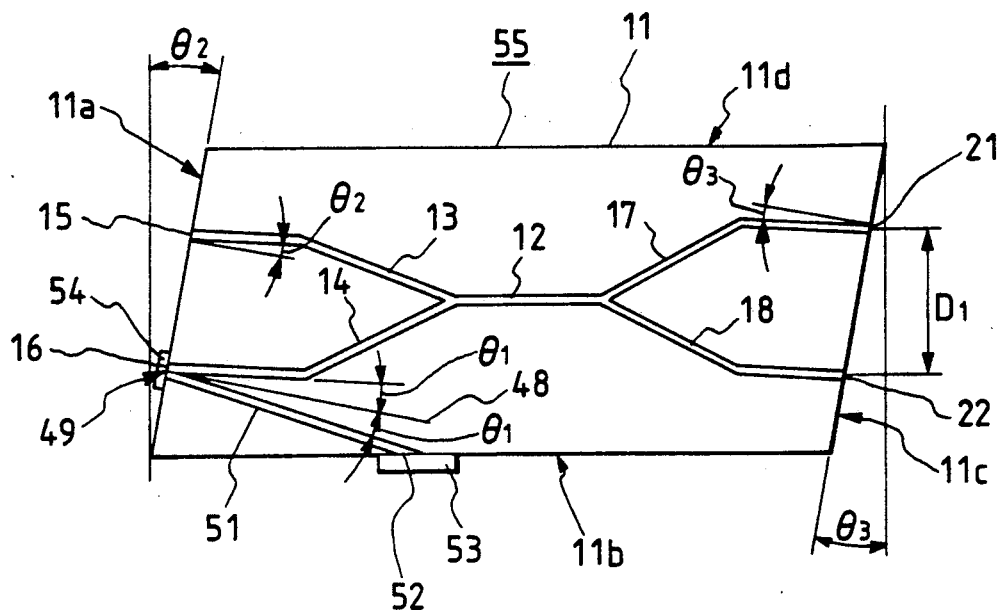
FIG. 5 is a diagram schematically illustrating an embodiment of the present invention.

FIG. 5 illustrates an embodiment of the present invention, in which the parts corresponding to those in FIG. 1 are identified by the same reference numerals. In this embodiment the terminal portion of the optical waveguide 14 meets one side 11a of the electro-optic plate 11 at an angle which deviates from 90°; namely, the optical waveguide terminal 16 of the optical waveguide 14 is inclined by an angle $\theta_1$ to a line 48 which is perpendicular to the one side 11a of the electro-optic plate 11. The end face of the optical waveguide 14 and consequently the end face of the optical waveguide terminal 16 forms a reflecting surface 49, which is coated with a reflecting film 54 to ensure the reflection by the reflecting surface 49. The reflecting film 54 can easily be coated by the evaporation of aluminum. In this embodiment there is formed an optical waveguide 51 by which light reflected by the reflecting surface 49 is guided to another side 11b of the electro-optic plate 11. To that end of the optical waveguide 51 which meets the side 11b of the electro-optic plate 11, that is, to an optical waveguide terminal, there is fixedly bonded a photodetector 53 which is a photoelectric transducer in this example.

In the FIG. 5 embodiment the angle between the side 11a of the electro-optic plate 11 and the optical waveguides 13 and 14 is deviated by $\theta_2$ from a right angle and the angle of the side 11c of the electro-optic plate 11 and the optical waveguides 17 and 18 is deviated by $\theta_3$ from a right angle so as to preclude the possibility of the occurrence of a Fresnel reflection on the end faces of the optical waveguides and hence prevent the occurrence of return light. The angles $\theta_2$ and $\theta_3$ each differ with the refractive index of the optical active element that is connected to the optical waveguide terminal. In this example the angle between the optical waveguide 14 and the side 11a is deviated from a right angle through utilization of the angle $\theta_2$, and hence $\theta_1 = \theta_2$.

The optical integrated circuit 55 of this embodiment is of about the same size as that of the conventional integrated circuit shown in FIG. 1, if optical fiber 125 μm in diameter is used, that is, if the distance $D_1$ is 125 μm.

Figure 6:
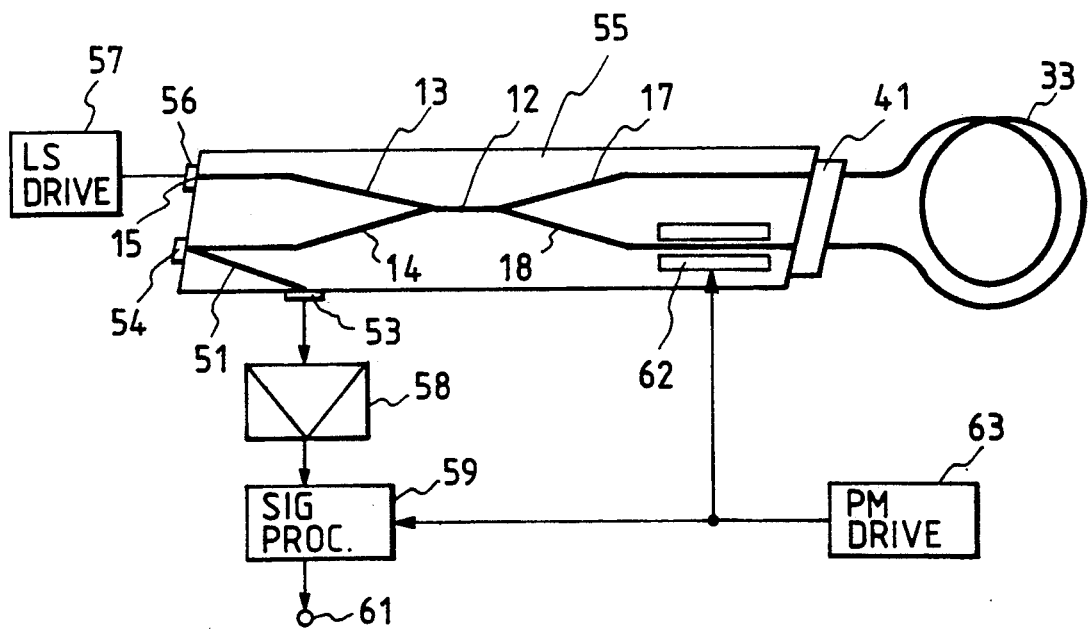
FIG. 6 is a block diagram showing the functional configuration of a fiber optic gyro utilizing the optical integrated circuit depicted in FIG. 5.
Figure 7:
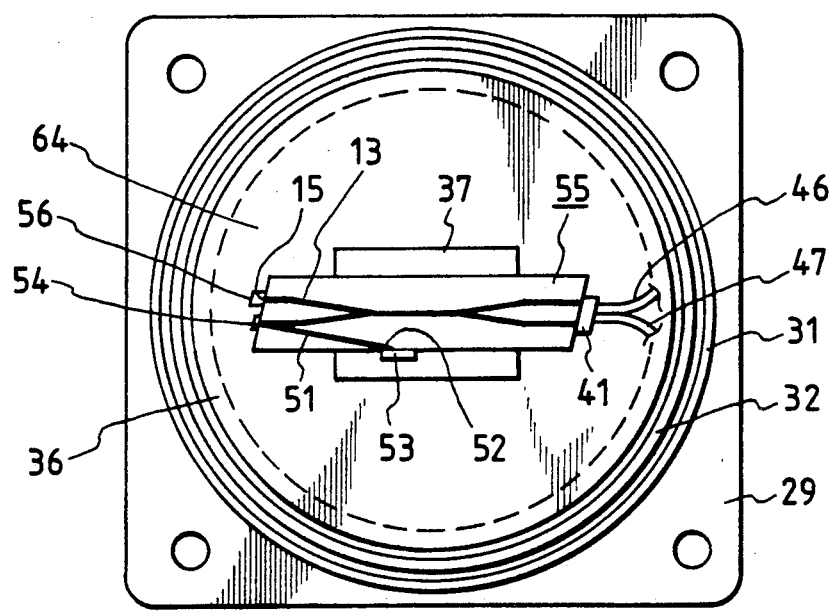
FIG. 7 is a plan view illustrating an example of the construction of the fiber optic gyro shown in FIG. 6.
Figure 8:
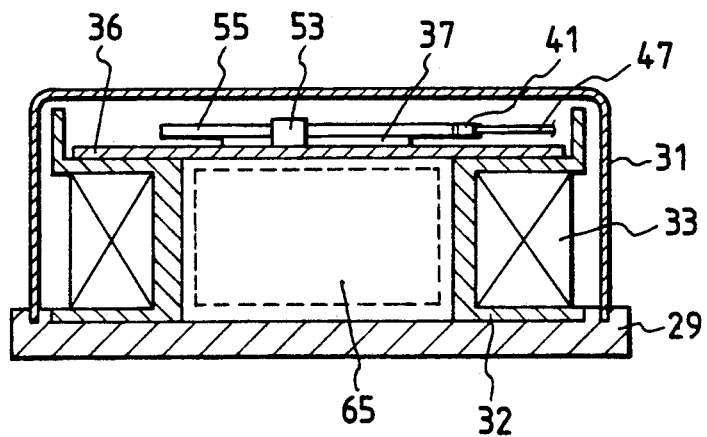
FIG. 8 is a side view of the fiber optic gyro shown in FIG. 7.

FIGS. 6 through 8 illustrate, by way of example, the optical integrated circuit 55 depicted in FIG. 5 built in a fiber optic gyro. At first, a light emitting element 56 is fixed directly to the terminal 15 of the optical integrated circuit 55 as shown in FIG. 6. The light emitting element 56 is driven by a light source driver 57 and the resulting light reaches the optical waveguide 12 via the optical waveguide 13. The light having reached the optical waveguide 12 is split into two light beams which are guided through optical waveguides 17 and 18, from which they propagate through the optical fiber coil 33 in opposite directions. The light beams having thus propagated through the optical fiber coil 33 are coupled together by the optical waveguide 12 to form interference light. The interference light is branched to the optical waveguides 13 and 14 and the light branched to the optical waveguide 14 is reflected by the reflecting film 54 to the photodetector 53 via the optical waveguide 51. A signal resulting from the photoelectric conversion by the photodetector 53 is amplified by an amplifier 58 and is then applied to a signal processor 59 formed by a synchronous detector. The input signal is processed by the signal processor 59 and is provided therefrom as the gyro output to a terminal 61. A phase modulator 62 formed on the optical waveguide 18 of the optical integrated circuit 55 is provided for accurately detecting input angular rate information which is provided to the optical fiber coil 33. A phase modulating voltage from a phase modulator driver 63 is applied across the electrodes of the phase modulator 62.

Figure 3:
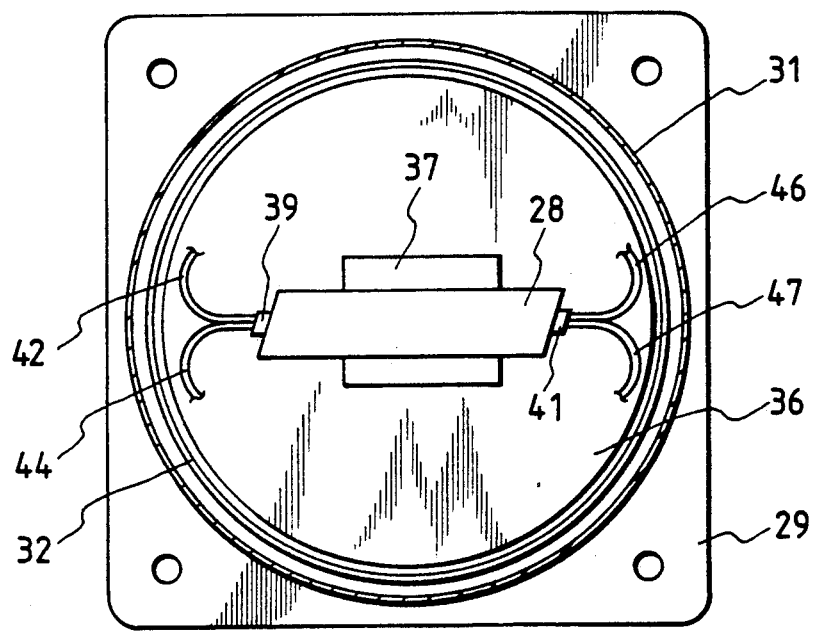
FIG. 3 is a plan view showing the construction of a conventional fiber optic gyro.
Figure 4:
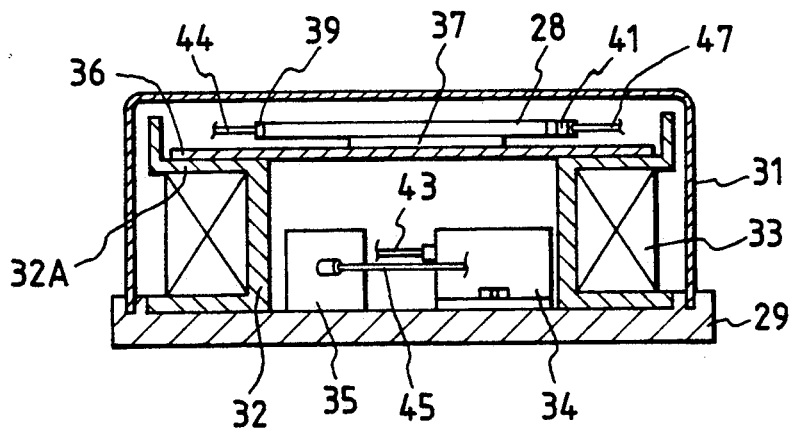
FIG. 4 is its sectional view.

Now, a description will be given, with reference to FIGS. 7 and 8, of the construction of the fiber optic gyro. The optical fibers 46 and 47 connected to the optical integrated circuit 55 by means of the holder 41 are each fused to one end of the optical fiber coil 33. The light emitting element 56 is connected to the optical waveguide terminal 15 of the optical waveguide 13. It is also possible, in this case, to form an optical waveguide type lens (such as a mode index lens, geodesic lens, or grating lens) near the optical waveguide terminal 15 of the optical waveguide 13 so as to improve the coupling between the light emitting element 56 and the optical waveguide 13. The photodetector 53 is bonded to the optical waveguide terminal 52 of the optical waveguide 51. Within a space 64 surrounded by the broken line there is disposed the base plate 36 as of ceramics, on which there are mounted the optical integrated circuit 55 and a hybrid IC carrying the light source driver 57, the amplifier 58, the phase modulator driver 63, etc. shown in FIG. 6. In a space 65 inside of the bobbin 32 there are disposed the photodetector module and the light source module in the prior art example depicted in FIGS. 3 and 4, but in this embodiment the photodetector 53 and the light emitting element 56 are mounted on the optical integrated circuit 55, and consequently the signal processor 59 and other components can be housed in the empty space.

Figure 9:
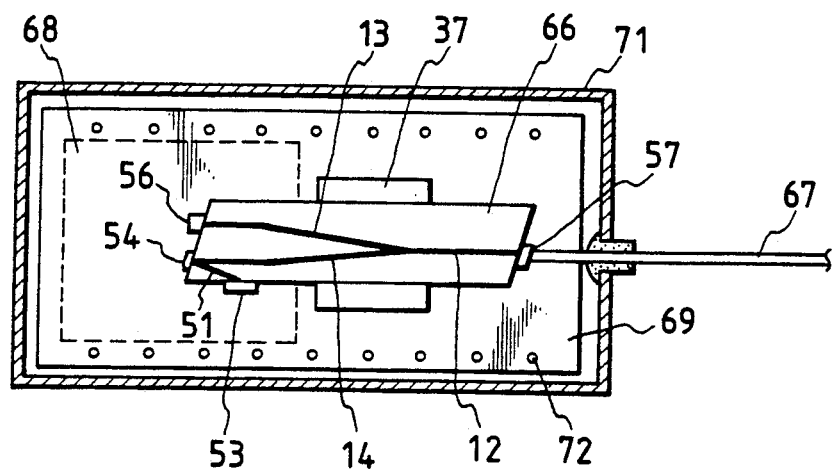
FIG. 9 is a plan view illustrating a transmitting-receiving module utilizing the optical integrated circuit of the present invention.
Figure 10:
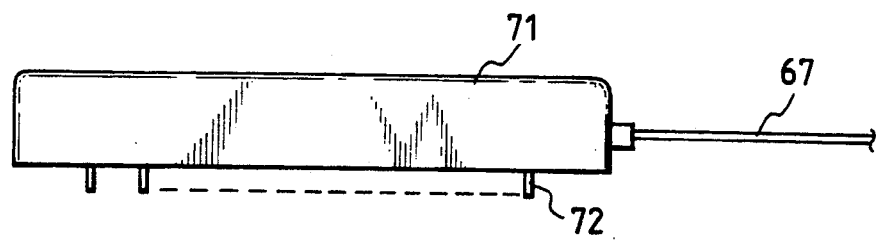
FIG. 10 is a front view of the module shown in FIG. 9.

FIGS. 9 and 10 illustrate an example of another embodiment of the present invention as applied to a transmitter-receiver module. An optical integrated circuit 66 is formed by the optical waveguides 12, 13, 14 and 51 of the optical integrated circuit 55 shown in FIG. 5. Light from the light emitting element 56 passes through the optical waveguide 13 and enters into the optical waveguide 12, from which it is provided on an optical fiber 67 for transmission. On the other hand, light transmitted over the optical fiber 67 enters into the optical waveguide 12, from which it is branched to the optical waveguides 13 and 14. The light branched to the optical waveguide 14 is reflected by the reflecting film 54 to the photodetector 53 via the optical waveguide 51. In a space 68 indicated by the broken line there are disposed on a base plate 69 as of ceramics, together with the optical integrated circuit 66, an electronic circuit for driving the light emitting element 56 and a circuit for amplifying the output signal from the photodetector 53, both circuits being miniaturized through use of hybrid IC packaging techniques. The circuits mounted on the base plate 69 are hermetically sealed by a cover case 71 and each terminal 72 is a hermetic terminal In FIG. 5 the optical waveguide 51 may also be formed so that its terminal 52 extends to the side 11c of the electro-optic plate 11. Also in such a case, the terminal 52 and terminals 21 and 22 can be spaced a large distance apart. The terminal 52 may also be extended to another side 11d of the electro-optic plate 11. In this instance, the optical waveguide 51 crosses other optical waveguides, but this can be implemented by sufficiently reducing its coupling with the crossed optical waveguides. The reflecting surface may also be formed on the end face of the optical waveguide 13 in place of the end face of the optical waveguide 14 and its terminal may be guided to another side of the electro-optic plate 11. Similarly, one terminal of each of the optical waveguides 17 and 18 may be positioned at another side of the plate 11.

As described above, according to the present invention, a photodetector, light emitting element or optical fiber can be connected directly to an optical integrated circuit with branched optical waveguides by employing a structure in which light in one of the branched optical waveguide is reflected by an end face of the optical integrated circuit to another end face thereof. In addition, the optical integrated circuit can be made small. This permits miniaturization of devices using the miniaturized optical integrated circuit, such as a fiber optic gyro and a transmitter-receiver module.

It will be apparent that many modifications and variations may be effected without departing from the scope of the novel concepts of the present invention.

What is claimed is:

1. An optical integrated circuit comprising:
   an electro-optic plate having a top face and at least four sides;
   first and second optical waveguides formed on the top face of said electro-optic plate, said first and second optical waveguides extending to reach one of said four sides at one ends of said optical waveguides, and said first and second optical waveguides being interconnected at the other ends thereof, a terminal portion of said first optical waveguide forming an angle other than 90 degrees with respect to said one side of said electro-optic plate;
   a third optical waveguide formed in the top face of said electro-optic plate, said third optical waveguide having one end thereof connected to the interconnection of said first and second optical waveguides to form a Y-shaped optical coupler wherein light from said third optical waveguide is branched to said first and second waveguides;
   a fourth optical waveguide formed in the top face of said electro-optic plate to extend from said one end of said first optical waveguide at said one of said four sides to another one of said four sides; and
   reflecting means formed on said one of said four sides to reflect light from said first optical waveguide to said fourth optical waveguide so that the reflected light is guided by said fourth optical waveguide to said another one of said four sides.

2. The optical integrated circuit of claim 1 wherein there are formed on said top face of said electro-optic plate fifth and sixth optical waveguides extending to reach at one ends thereof a side of said electro-optic plate different from said one side, said fifth and sixth optical waveguides being interconnected to one another at the other ends thereof, the connection point of said fifth and sixth optical waveguides being connected to the other end of said third optical waveguide, light from said fifth and sixth optical waveguides being supplied together to said third optical waveguide and light from said third optical waveguide being branched to said fifth and sixth optical waveguides.

3. The optical integrated circuit of claim 1 or 2, wherein said reflecting mean is a reflecting film.

4. The optical integrated circuit of claim 1 or 2, wherein an optical active element is fixedly mounted on an end face of said fourth optical waveguide located adjacent said another one of said four sides, said optical active element being optically coupled to said fourth optical waveguide.

5. The optical integrated circuit of claim 1 or 2, wherein an optical active element is fixed mounted on said one end face of said second optical waveguide at said one side of said electro-optic plate, said optical active element being optically coupled to said second optical waveguide.

6. The optical integrated circuit of claim 5, wherein said optical active element is one of a light emitting element and a photodetector, and the other of said light emitting element and photodetector being fixedly mounted adjacent an end of said fourth optical waveguide opposite from said reflecting means and is optically coupled to said fourth optical waveguide.

7. The optical integrated circuit of claim 2, wherein electrodes for phase modulation use are formed on opposite sides of said fifth optical waveguide.

* * * * *